(12) United States Patent
Chen et al.

(10) Patent No.: US 10,156,758 B2
(45) Date of Patent: Dec. 18, 2018

(54) LIQUID CRYSTAL DISPLAY

(71) Applicant: Shenzhen China Star Optoelectronics Technology Co., Ltd., Shenzhen, Guangdong (CN)

(72) Inventors: Cheng Hung Chen, Guangdong (CN); Zuomin Liao, Guangdong (CN)

(73) Assignee: SHENZHEN CHINA STAR OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 14/417,617

(22) PCT Filed: Jan. 20, 2015

(86) PCT No.: PCT/CN2015/071116
§ 371 (c)(1),
(2) Date: May 4, 2016

(87) PCT Pub. No.: WO2016/095315
PCT Pub. Date: Jun. 23, 2016

(65) Prior Publication Data
US 2016/0246103 A1  Aug. 25, 2016

(30) Foreign Application Priority Data

Dec. 18, 2014 (CN) .......................... 2014 1 0802522

(51) Int. Cl.
*G02F 1/1343* (2006.01)
*G02F 1/1362* (2006.01)
*G02F 1/1368* (2006.01)

(52) U.S. Cl.
CPC ........ *G02F 1/13624* (2013.01); *G02F 1/1368* (2013.01); *G02F 1/136286* (2013.01); *G02F 2001/134345* (2013.01)

(58) Field of Classification Search
CPC .......... G02F 1/13624; G02F 1/136286; G02F 1/1368; G02F 2001/134345; G02F 2203/30
USPC ............................................ 349/43, 85, 144
See application file for complete search history.

(56) References Cited

U.S. PATENT DOCUMENTS

| 2014/0104523 A1* | 4/2014 | Jung | G02F 1/1343 349/41 |
| 2014/0293181 A1* | 10/2014 | Lo | G02F 1/136286 349/43 |

FOREIGN PATENT DOCUMENTS

| CN | 101017299 A | 8/2007 |
| CN | 102809856 A | 12/2012 |
| CN | 103529611 A | 1/2014 |
| CN | 103760701 A | 4/2014 |

(Continued)

OTHER PUBLICATIONS

International Search Report and Written Opinion, China.

*Primary Examiner* — Angela K Davison
(74) *Attorney, Agent, or Firm* — Kim Winston LLP

(57) ABSTRACT

A liquid crystal display is provided according to the present disclosure, which pertains to the technical field of display. At least one liquid crystal sub pixel comprises a first branch sub pixel, a second branch sub pixel, and a third branch sub pixel, respectively having a first thin film transistor and a first branch sub pixel electrode, a second thin film transistor and a second branch sub pixel electrode, and a third thin film transistor and a third branch sub pixel electrode.

3 Claims, 1 Drawing Sheet

(56) References Cited

FOREIGN PATENT DOCUMENTS

TW          200815884 A    4/2008

\* cited by examiner

LIQUID CRYSTAL DISPLAY

CROSS REFERENCE TO RELATED APPLICATION

Figure 1:
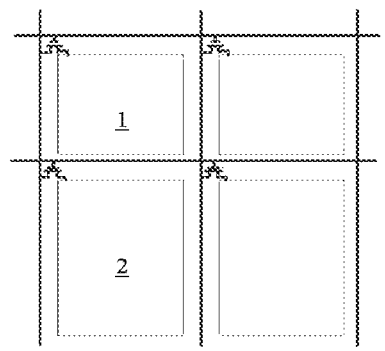

The present application claims benefit of Chinese patent application CN 201410802522.3, entitled "A Liquid Crystal Display" and filed on Dec. 18, 2014, which is incorporated herein by reference.

TECHNICAL FIELD

The present disclosure relates to the technical field of display, and in particular to a liquid crystal display comprising therein improved liquid crystal sub pixels.

TECHNICAL BACKGROUND

Liquid crystal display is a passive display, which cannot emit light directly, but only uses light from the surrounding environment. The liquid crystal display (LCD) only requires very little energy to display patterns or characters, and thus has become a preferred display mode due to low power consumption and small size thereof.

The liquid crystal material used in the liquid crystal display is an organic matter comprising both liquid phase and solid phase. Molecules of the liquid crystal material each having a rod-like structure, and are usually aligned in a liquid crystal cell in parallel. However, the orientations of the liquid crystal molecules can be changed in an electric field. For a positive twist nematic liquid crystal display (TN-LCD), when no voltage is applied to an electrode, the liquid crystal display (LCD) is in an off state. In this case, light can pass through the LCD, and thus the LCD appears bright. When voltage is applied to the electrode, the LCD is turned on. In this case, the liquid crystal molecules are aligned with the long axes thereof being oriented in the direction of the electric field. Light cannot pass through the LCD, and thus the LCD appears dark. Voltage can be selectively applied to the electrode, so that different images can be displayed. In a super twist nematic liquid crystal display (STN-LCD), because the twisted angle of the liquid crystal is larger, the contrast ratio thereof is better and the viewing angle is wider.

A liquid crystal display comprises a liquid crystal cell, which is formed by two conductive glass sheets and filled with liquid crystal. The four sides of the liquid crystal cell are sealed with sealing material, which is generally a glue made of epoxy resin. Each of the exterior sides of the liquid crystal cell is provided with a polarizer.

A distance between the upper and the lower glass sheets in the liquid crystal cell, which is usually called a cell thickness, is generally several micrometers. The smallest discernible diameter to the naked eyes is a few tens of micrometers. Transparent indium tin oxide (ITO) conductive film, i.e., display electrode, is coated on an interior area on each of the upper and the lower glass sheets, corresponding to the image display area. External electric signal is transmitted to the liquid crystals through the display electrodes.

An orientation layer covers the entire display area on the interior side of each of the glass sheets in the liquid crystal cell. The liquid crystal molecules can be aligned in a specific direction under the action of the orientation layer, which is usually a thin layer of macromolecule organic treated with a rubbing process. The orientation layer can also be formed through vacuum evaporation of silicon oxide thin film on the glass surface for a certain angle.

A twist nematic (TN) liquid crystal display is filled with positive nematic liquid crystals. The orientation of the liquid crystal molecules means that the long rod-like liquid crystal molecules are aligned in a fixed direction in parallel with the surfaces of the glass sheets, and the long axes thereof are along a surface orientation. The surface orientation of the upper glass sheet is perpendicular to that of the lower glass sheet. In this case, the orientations of the liquid crystal molecules along a direction perpendicular with respect to the glass sheets gradually twist, i.e., the orientation of liquid crystal molecules on the lower glass sheet twists for 90 degrees with respect to that of corresponding liquid crystal molecules on the upper glass sheet. This is where the name of the twist nematic liquid crystal display comes from.

In fact, liquid crystal molecules close to the surface of the glass sheet are not completely parallel therewith, but rather form an angle with respect to the surface of the glass sheet. Such an angle is called a pre-tilt angle, being in a range of 1° to 2°.

A polarizer is arranged on each of the exterior surfaces of the two glass sheets in the liquid crystal cell. Polarization axes of the two polarizers are parallel with each other (normally black mode with dark background and bright character) or perpendicular to each other (normally white mode with bright background and dark character), and each are parallel with the surface orientation of the corresponding glass sheet. The polarizers are usually formed from macromolecular plastic film under certain process conditions.

Due to the intrinsic factors of the liquid crystal display, an image observed from different positions of the liquid crystal display would always be different. As a result, an image, which is normal when being observed at a center viewing angle, would be abnormal when being observed at a wide angle. Such a phenomenon is called color shift with large viewing angle. In the prior art, the structure as shown in FIG. 1 is generally adopted. That is, one sub pixel is divided into a main sub pixel 1 and a secondary sub pixel 2, which are respectively provided with different electric potentials under a specific gray scale. In this case, there are two orientations of the liquid crystal molecules under the same gray scale, thereby the difference between brightness under a wide viewing angle and that under a center viewing angle can be relatively small. Currently, most manufacturers use the above design of sub pixels. However, the display effect of such design is still limited. Therefore, in order to obtain better display quality under wide viewing angle, a new design is proposed according to the present disclosure.

SUMMARY OF THE INVENTION

In order to achieve better display quality under a large viewing angle, a liquid crystal display comprising therein improved liquid crystal sub pixels is provided according to the present disclosure.

According to embodiment 1 of the present disclosure, in a liquid crystal display, at least one liquid crystal sub pixel comprises a first branch sub pixel, a second branch sub pixel, and a third branch sub pixel, respectively having a first thin film transistor and a first branch sub pixel electrode, a second thin film transistor and a second branch sub pixel electrode, and a third thin film transistor and a third branch sub pixel electrode. Each sub pixel is divided into several different branch sub pixels, so that the orientation of the liquid crystals corresponding to the sub pixel can be flexibly controlled, thereby the discrepancy of an image viewed from different angles can be alleviated.

According to embodiment 2 which is obtained through improvements on the basis of embodiment 1, a first voltage is distributed to the first branch sub pixel electrode, a second voltage is distributed to the second branch sub pixel electrode, and a third voltage is distributed to the third branch sub pixel electrode, the first voltage, the second voltage and the third voltage being different from one another. In this case, when different voltages are applied to different branch sub pixel electrodes, in each liquid crystal sub pixel, a deflection angle of the liquid crystals corresponding to each branch sub pixel can be different from that of any other branch sub pixels. Thus, in each sub pixel, the light passing through the liquid crystals can present several different states (such as in the aspects of light intensity and angle of polarization, and the like). As a result, when an image is viewed from different angles, the discrepancy of visual effect thereof will not be obvious, thereby the display quality of the liquid crystal display under a large viewing angle can be effectively improved.

According to embodiment 3 which is obtained through improvements on the basis of embodiment 2, the third voltage is 40%-65% of the first voltage. The display effect of the liquid crystal display can be optimal under the voltages in said ranges. As the viewing angle changes, the image on the display transits naturally. In this case, the defect of abnormal display under a large viewing angle can be significantly alleviated.

According to embodiment 4 which is obtained through improvements on the basis of embodiment 2 or embodiment 3, the second voltage is 60%-80% of the first voltage. The display effect of the liquid crystal display can be optimal under the voltages in said ranges. As the viewing angle changes, the image on the display transits naturally. In this case, the defect of abnormal display under a large viewing angle can be significantly alleviated.

According to embodiment 5 which is obtained through improvements on the basis of embodiment 2, embodiment 3 or embodiment 4, the first voltage is larger than the second voltage, which is in turn larger than the third voltage. Such configuration is the best with respect to the writing efficiency of the pixel signal, and also beneficial for the design of wirings.

According to embodiment 6 which is obtained through improvements on the basis of any one of embodiments 1 to 5, the liquid crystal display further comprises a first gate line for controlling the first thin film transistor, a second gate line for controlling the second thin film transistor, and a third gate line for controlling the third thin film transistor.

According to embodiment 7 which is obtained through improvements on the basis of any one of embodiments 1 to 6, the liquid crystal display further comprises a data line for providing voltages respectively to the first branch sub pixel electrode, the second branch sub pixel electrode, and the third branch sub pixel electrode.

A gate line is used for controlling the on/off state of a thin film transistor corresponding thereto. When a predetermined voltage is applied to the thin film transistor through the gate line, a corresponding branch sub pixel electrode is connected to the data line through the thin film transistor, so that a corresponding voltage is applied to the branch sub pixel electrode through the data line. In this manner, the write-in of different voltages can be completed.

According to embodiment 8 which is obtained through improvements on the basis of any one of embodiments 1 to 7, the first branch sub pixel is disposed at a top portion of a corresponding liquid crystal sub pixel, the second branch sub pixel is disposed at a central portion thereof, and the third branch sub pixel is disposed at a bottom portion thereof.

According to embodiment 9 which is obtained through improvements on the basis of any one of embodiments 1 to 7, the first branch sub pixel is disposed at the central portion of a corresponding liquid crystal sub pixel, the second branch sub pixel is disposed at the bottom portion thereof, and the third branch sub pixel is disposed at the top portion thereof.

According to embodiment 10 which is obtained through improvements on the basis of any one of embodiments 1 to 7, the first branch sub pixel is disposed at the bottom portion of a corresponding liquid crystal sub pixel, the second branch sub pixel is disposed at the top portion thereof, and the third branch sub pixel is disposed at the central portion thereof.

It can be seen from the above that according to the present disclosure, the locations of different branch sub pixels in a liquid crystal sub pixel can be arranged freely and highly flexibly based on the process requirements. Therefore, the liquid crystal sub pixel according to the present disclosure has strong adaptability to different situations.

In the liquid crystal display according to the present disclosure, a liquid crystal sub pixel can comprise different branch sub pixels, to which voltages with different values of specific proportion relationship are respectively applied, thereby influencing the orientations of the liquid crystals. As a result, the image displayed under a wide viewing angle can be greatly improved, and the overall display quality of the liquid crystal display can be enhanced.

As long as the objective of the present disclosure is achieved, the above technical features can be combined in any technically feasible manner, so that new embodiments can be obtained.

BRIEF DESCRIPTION OF THE
ACCOMPANYING DRAWINGS

Figure 2:
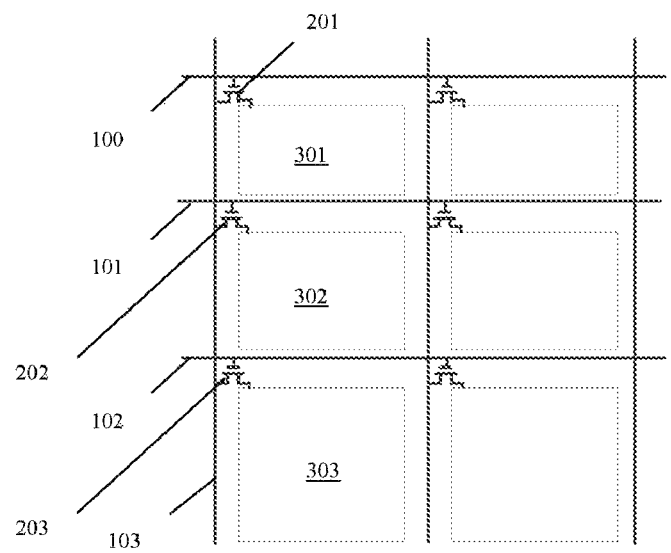

The present disclosure will be described in detail based on the non-limiting examples in view of the accompanying drawings. In which:

FIG. 1 shows a design of a sub pixel in a liquid crystal display in the prior art, and FIG. 2 shows a design of a sub pixel in a liquid crystal display according to the present disclosure.

In the drawings, same components are indicated with the same reference sign. The drawings are not drawn to actual scale.

DETAILED DESCRIPTION OF THE
EMBODIMENTS

The present disclosure will be described in detail in view of the accompanying drawings.

As shown in FIG. 2, a liquid crystal display is provided according to the present disclosure. At least one liquid crystal sub pixel of the liquid crystal display comprises a first branch sub pixel 301, a second branch sub pixel 302, and a third branch sub pixel 303. The first branch sub pixel 301, the second branch sub pixel 302, and the third branch sub pixel 303 respectively have a first thin film transistor 201 and a first branch sub pixel electrode, a second thin film transistor 202 and a second branch sub pixel electrode, and a third thin film transistor 203 and a third branch sub pixel electrode.

A first voltage $V_a$ is distributed to the first branch sub pixel electrode, a second voltage $V_b$ is distributed to the second branch sub pixel electrode, and a third voltage $V_c$ is distributed to the third branch sub pixel electrode, the first voltage, the second voltage and the third voltage being different from one another. In this case, because different branch sub pixel electrodes are provided with different voltages, in each liquid crystal sub pixel, the angle of deflection of the liquid crystals corresponding to each branch sub pixel is different from that of the liquid crystals corresponding to any other branch sub pixels. As a result, in each sub pixel, the light passing through the liquid crystals can present multiple different states (such as in the aspects of light intensity and angle of deflection, and the like), so that an image viewed from different angles would not appear obvious difference in terms of visual effect, thereby the display quality of the liquid crystal display under a wide viewing angle can be effectively improved.

Preferably, the third voltage $V_c$ is 40%-65% of the first voltage $V_a$, and the second voltage $V_b$ is 60%-80% of the first voltage $V_a$. The display effect of the liquid crystal display under the voltages in said ranges can be optimal. As the viewing angle changes, the image on the display transits naturally. In this case, the defect of abnormal display under large viewing angle can be significantly alleviated.

In an example, the first voltage $V_a$ is larger than the second voltage $V_b$, which is in turn larger than the third voltage $V_c$. Such configuration is the best with respect to the writing efficiency of the pixel signal, and also beneficial for the design of wirings.

The above proportional relationship of the voltages can be obtained under a low gray scale voltage range, or a medium gray scale voltage range, or a high gray scale voltage range.

As shown in FIG. 2, the liquid crystal display according to the present disclosure further comprises a first gate line 100 for controlling the first thin film transistor 201, a second gate line 101 for controlling the second thin film transistor 202, and a third gate line 102 for controlling the third thin film transistor 203. The liquid crystal display according to the present disclosure further comprises a data line 103 for providing voltages respectively to the first branch sub pixel electrode, the second branch sub pixel electrode, and the third branch sub pixel electrode.

The first gate line 100 is used for controlling the on/off state of the first thin film transistor 201. When a predetermined voltage is applied to the first thin film transistor 201 through the first gate line 100, the first branch sub pixel electrode is connected to the data line 103 through the first thin film transistor 201, so that the first voltage $V_a$ is applied to the first branch sub pixel electrode through the data line 103.

The second gate line 101 is used for controlling the on/off state of the second thin film transistor 202. When a predetermined voltage is applied to the second thin film transistor 202 through the second gate line 101, the second branch sub pixel electrode is connected to the data line 103 through the second thin film transistor 202, so that the second voltage $V_b$ is applied to the second branch sub pixel electrode through the data line 103.

The third gate line 102 is used for controlling the on/off state of the third thin film transistor 203. When a predetermined voltage is applied to the third thin film transistor 203 through the third gate line 102, the third branch sub pixel electrode is connected to the data line 103 through the third thin film transistor 203, so that the third voltage $V_c$ is applied to the third branch sub pixel electrode through the data line 103.

The locations of the first branch sub pixel 301, the second branch sub pixel 302 and the third branch sub pixel 303 can be arranged in the following manners.

The first branch sub pixel 301 can be disposed at a top portion of a corresponding liquid crystal sub pixel, or at a central portion thereof, or at a bottom portion thereof.

The second branch sub pixel 302 can be disposed at a top portion of a corresponding liquid crystal sub pixel, or at a central portion thereof, or at a bottom portion thereof.

The third branch sub pixel 303 can be disposed at a top portion of a corresponding liquid crystal sub pixel, or at a central portion thereof, or at a bottom portion thereof.

Thus, the locations of different branch sub pixels in a liquid crystal sub pixel according to the present disclosure can be arranged freely and highly flexibly based on the process requirements. Therefore, the liquid crystal sub pixel according to the present disclosure has strong adaptability to different situations.

In the liquid crystal display according to the present disclosure, a liquid crystal sub pixel can comprise different branch sub pixels, to which voltages with different values of specific proportion relationship are respectively applied, thereby influencing the orientations of the liquid crystals. As a result, the image displayed under a wide viewing angle can be greatly improved, and the overall display quality of the liquid crystal display can be enhanced.

Although the present disclosure has been described with reference to preferred embodiments, various modifications and variants to the present disclosure may be made by anyone skilled in the art, without departing from the scope and spirit of the present disclosure. In particular, as long as there is no structural conflict, various embodiments as well as the respective technical features mentioned herein may be combined with one another in any manner. The present disclosure is not limited to the specific examples disclosed herein, but rather includes all the technical solutions falling within the scope of the claims.

The invention claimed is:

1. A liquid crystal display, wherein at least one liquid crystal sub pixel comprises:

a first branch sub pixel, a second branch sub pixel, and a third branch sub pixel, respectively having a first thin film transistor and a first branch sub pixel electrode, a second thin film transistor and a second branch sub pixel electrode, and a third thin film transistor and a third branch sub pixel electrode;

said liquid crystal display further comprising a first gate line for controlling the first thin film transistor, a second gate line for controlling the second thin film transistor, and a third gate line for controlling the third thin film transistor; and said liquid crystal display further comprising a data line for providing voltages respectively to the first branch sub pixel electrode, the second branch sub pixel electrode, and the third branch sub pixel electrode, wherein the first branch sub pixel is disposed at a central portion of a corresponding liquid crystal sub pixel, the second branch sub pixel is disposed at a bottom portion thereof, and the third branch sub pixel is disposed at a top portion thereof, wherein a first voltage is distributed to the first branch pixel electrode, a second voltage is distributed to the second branch pixel electrode, and a third voltage is distributed to the third branch pixel electrode, the first voltage, the second voltage and the third voltage being different from one another, and the third voltage is 40% of the first voltage.

2. The liquid crystal display according to claim 1, wherein the second voltage is 60%-80% of the first voltage.

3. The liquid crystal display according to claim 1, wherein the first voltage is larger than the second voltage, which is in turn larger than the third voltage.

\* \* \* \* \*